Oct. 6, 1953 — C. H. KAFER — 2,654,115
SNAP-ON BASKET HANDLE
Filed April 10, 1951 — 2 Sheets-Sheet 1
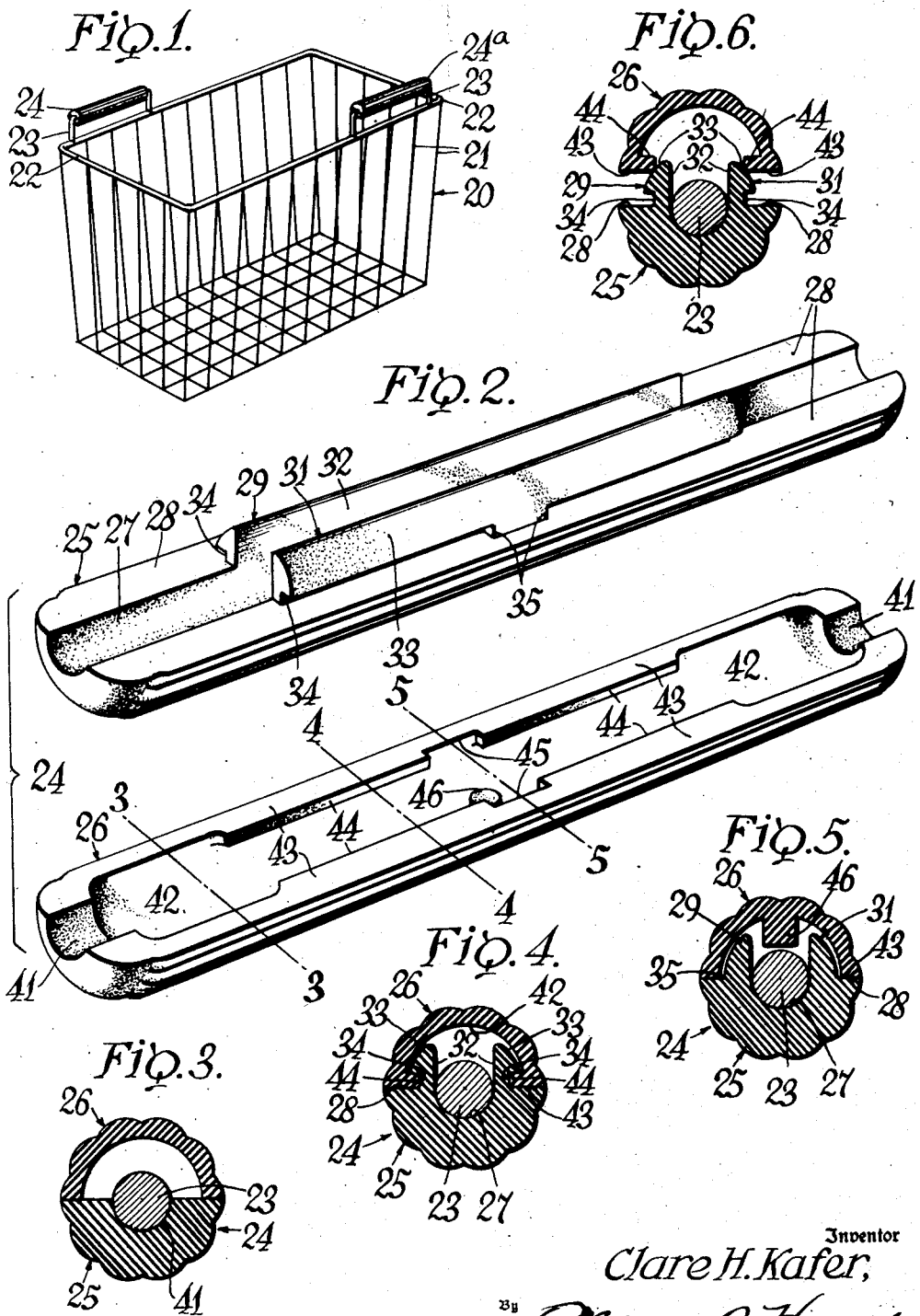
Inventor
Clare H. Kafer,
By Albert R. Henry
Attorney

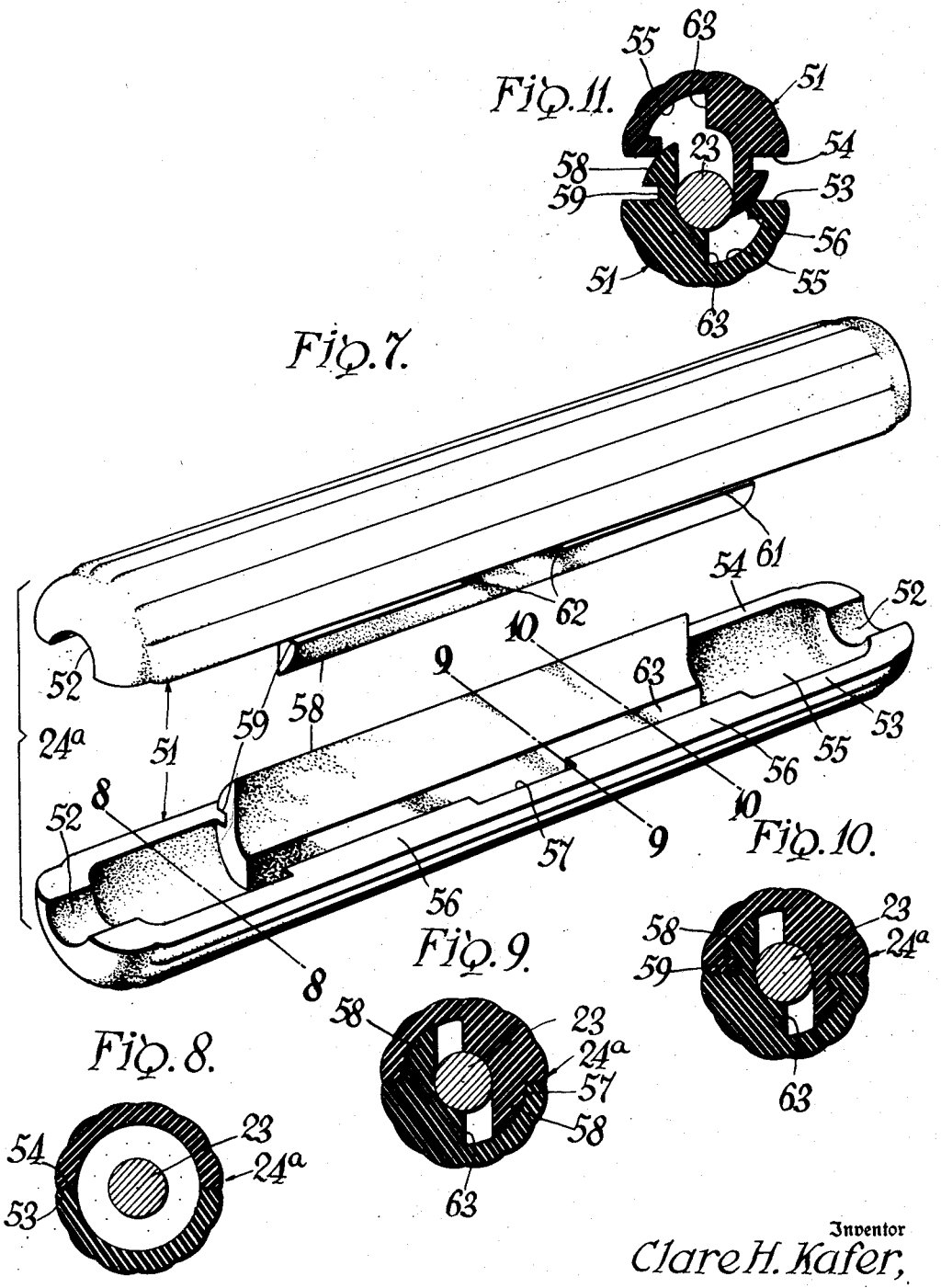

Patented Oct. 6, 1953

2,654,115

UNITED STATES PATENT OFFICE 2,654,115

SNAP-ON BASKET HANDLE

Clare H. Kafer, Palmyra, Mich., assignor to Revco, Inc., Deerfield, Mich.

Application April 10, 1951, Serial No. 220,199

6 Claims. (Cl. 16—125)

This invention relates to a handle which may be made in two parts and snapped over a carrying bail of a basket, pail, or like portable container. The primary object of the invention is to provide an inexpensive handle which advantageously may be formed of material of low heat conductivity, and which, when positioned on a bail, is firmly and securely retained in place.

One use for the invention is in connection with wire baskets of the type employed with deep freeze or frozen food storage cabinets. A number of containers are provided with the cabinet, so that the user may segregate the contents into various groups, and remove a basket when it is desired to fill or unload the container. Such baskets are frequently made of interconnected wires, and with lifting bails at the top, and they are frequently plated to improve appearance and to resist oxidation. The low temperatures maintained in such cabinets makes it highly desirable to cover the bails with some material of low heat conductivity. Otherwise, there is likelihood of the bare hands sticking to the metal, with attendant risk of personal injury as well as discomfort. Because of the forming and finishing operations involved in fabricating these containers, it is impractical to apply an ordinary wooden tubular handle before the basket is completed, and it is practically impossible to apply such a handle after the basket has been made, inasmuch as both ends are connected. Built-up or wrapped handles are fairly serviceable, but the cost of applying them is significant. These considerations will illustrate the special utility of the present invention, and it will, of course, be readily understood that the hereinafter described handle may be used on a great variety of containers, specifically intended for other purposes.

The nature and advantages of the invention will be readily understood from the following description of typical embodiments, to be read in connection with the appended drawing, wherein:

Fig. 1 is a perspective of a portable container, provided with carrying bails to which the invention is applied;

Fig. 2 is an exploded perspective of the two parts of one form of handle;

Figs. 3, 4, and 5 are sections taken at the regions designated by the correspondingly numbered lines on Fig. 2, each showing the handle as assembled on a bail;

Fig. 6 is a section similar to Fig. 4, but showing the parts in the course of assembly;

Fig. 7 is an exploded perspective of the two parts of another embodiment of the invention;

Figs. 8, 9, and 10 are sections taken on the correspondingly numbered section lines on Fig. 7; and, Fig. 11 is a section similar to Fig. 10, showing the handle sections in the course of assembly.

The container shown in Fig. 1 comprises a substantially rectilinear basket 20 formed from bent and interconnected wires 21 to provide a hollow body which is suspended from an upper rim 22. For convenience in handling, U-shaped bails 23 are welded, brazed, or otherwise connected at their ends to the rim. The container, after being assembled and coated or plated, is then equipped with a pair of handles 24 or 24a. It will be obvious that the present invention does not reside in the details of the illustrated container, as it could as readily be a bucket, sieve, or other portable article to which one or more carrying handles are applicable.

The handle illustrated in Figs 2 to 6 is advantageously made in two parts, each of such length as to cover the horizontal portion of the bail 23. In this embodiment, these may be termed a male part or half 25, and a female part 26. They are so constructed that, when they are superimposed on each other, they may be snapped together to provide a generally cylindrical handle, in which the two halves cannot be displaced in endwise relationship, and can only be pried apart with great difficulty or by special tools.

The male member 25 comprises a semi-cylindrical tube having a half bore or cavity 27 having a radius preferably slightly greater—that is, by a few thousandths of an inch—than the radius of the bail to which the handle is to be applied. The external radius of the member 25 is, of course, made a value which can be comfortably grasped by the hand, or, for containers such as that shown in Fig. 1, about three eighths of an inch. As the bail itself will have a less radius, there are accordingly provided spaced longitudinally extending flat surfaces 28, which lie in the same diametrical plane.

The midsection of the male member 25 is provided with a pair of outstanding tenons 29, 31, which project from the surfaces 28 and are tangent to the bore 27 on their inner faces 32. The outer faces 33 of the tenons are arcuate, and it will be readily apparent that they are struck on a radius intermediate the external and internal radii of the part 25. Except for a short distance at the centers of the tenons, their external faces are undercut or rabbeted at their juncture with the flat surfaces 28 to provide grooves 34. At the central portions, the outer arcuate faces of the tenons are carried to the flat surfaces 28, to form stop shoulders 35.

The companion female half 26 of the handle is also semi-cylindrical and of the same external radius as the part 25. It is formed at its ends with half bores 41 having the same radius as the bore 27. These bores 41 merge into a substantially semi-cylindrical cavity 42 whose radius is such that the tenons 29 and 31 may fit within it, and with sufficient clearance to enable the plane surfaces 28 to abut marginal plane surfaces 43 formed on the part 26. The surfaces 43 are not of uniform width, being narrower adjacent the ends and also at the center, thereby to provide overhanging flanges 44 and a medially located notch 45. The flanges 44 are of substantially the same length and width as the rabbets 34, while the notches 45 have the same length as the stops 35 on the male member 25. The female member 26 also is provided with a locating button 46 equidistant from its ends, and of such height as to abut the bail 23 when the parts are placed under considerable radial compression, thereby protecting the part from undue risk of crushing.

The handle parts are advantageously fabricated by a molding operation from one of the numerous plastics—either semi-hard rubber or one of the synthetics—although, of course, other materials and techniques may be used. Inasmuch as one use for the handle is in a deep freeze cabinet, the material should be resistant to moisture and low temperatures, and it should have a fair impact strength and toughness, while also possessing sufficient flexibility and resilience to permit assembly in the manner herein described. After forming the two halves by such procedure as may be desired, they are superimposed upon each other and snapped together. Figs. 3 to 6 illustrate the assembly as though the female part 26 in Fig. 2 has been turned over and placed above the male part 25.

It will be seen that the two parts must be axially aligned, inasmuch as the stop shoulders 35 of the male member have to be brought into registry with the notches 45, in which they fit with no more than a nominal working clearance. The tips of the tenons 29 and 31 initially rest against the inner edges of the flanges 44, as will appear from Fig. 6. As the parts are then pressed against each other, the outer curved surfaces 33 of the tenons act as cam elements, which, coupled with the limited resilience of the material, enables the tenons to slide past the flanges 44 until the grooves 34 are locked thereunder. The marginal surfaces 28 and 43 then abut each other to provide a substantially continuous outer surface, which, as shown, may be longitudinally fluted or reeded for the convenience of the user.

It will be seen that the shoulders 35 and notches 45 not only insure initial alignment of the parts, but also cooperate after assembly to prevent endwise displacement. The engagement of the grooves 34 and flanges 44 prevents the two halves from being pulled apart, and, in service, the handle is practically a unitary structure.

The handle 24a shown in Figs. 7 to 11 is quite similar to that just described, the main difference being that each of the halves is provided with a tenon along one margin and with a cooperating flange along the other. The two halves are identical and are symmetrical with respect to the transverse center line, and they may be made in the same mold. Each part 51 is generally semi-cylindrical, and is formed with half bores 52 at the ends to fit around the bail 23. The part is also formed with plane marginal surfaces 53 and 54 which delimit a clearance cavity 55 between the ends.

The marginal surface 53 is formed with inwardly projecting flanges 56 and a centrally located notch 57, which correspond to the flanges 44 and notch 45 of the other embodiment. The surface 54 is provided with a tenon element 58, which, like the tenons 29 and 31, extends outwardly and is formed with the grooves 59 and 61, spaced by a stop shoulder 62 having the same length as the notch 57. The outer and inner surfaces of the tenon 58 are respectively convex and plane—the latter merging into the cavity 55 through a rib 63 which may be as long as the tenon, and which protects the handle from compressive strains similar to the button 46.

From what has previously been explained, it will now be apparent that when two parts 51 are superimposed and axially aligned, the tenons 58 initially abut the flanges 56, and the stop shoulder 62 of one piece may be forced into the notch 57 of the companion piece with the same camming and yielding action. The flanges 56 then engage the notches 59 and 61 to lock the parts together, and the shoulder 62 of course prevents endwise displacement.

It will be seen that both embodiments provide a two-part handle including cooperating locating and positioning shoulders and notches, and interlocking tenon and flange elements. Each is assembled by a simple compression or snap-on action, and each is so formed that the handle is secure against working loose during service. While the invention has been described with respect to only two embodiments, it will be apparent that modifications may be made without departure from its principles. It is therefore intended to encompass all such variations as are within the scope of the following claims.

I claim:

1. A handle adapted to be assembled over a bail having connected ends comprising two semi-cylindrical members formed axially with cavities to provide clearance around the bail and with diametrically disposed marginal portions adapted to abut each other, at least one of said marginal portions being formed with longitudinally spaced inwardly extending flanges defining a notch therebetween, at least another of said marginal portions being formed with an upstanding tenon having a tapered outer surface and a rabbet groove intermediate said surface and said marginal portion, the width of said groove being substantially equal to the width of said flanges, said tenon being also formed with a stop shoulder filling a portion of said groove and interrupting the continuity thereof, said shoulder and notch having substantially the same length and width and being so positioned on said marginal portions that they register when the two members are superimposed and aligned, at least one of said members being resilient whereby said tapered surface and flange may slide over each other under radially applied compressive force to bring said flanges into interlocking engagement with said groove and said shoulder into engagement with said notch to restrain said members from endwise displacement, the remaining marginal portions of said members being respectively formed with a complementary inwardly extending flange and an upstanding tenon having a groove between its marginal portion and outer face of the tenon adapted to mutually interlock when the first named flanges and tenon are brought into said interlocking engagement.

2. A two part snap on handle comprising a pair of semi-cylindrical members of the same length and diameter and having diametrically located marginal portions, each of said members being recessed to enable said members to be positioned around a bail with the marginal surfaces abutting each other, at least one of said members being formed with inwardly projecting flanges having outer surfaces aligned with the marginal portions, said flanges being spaced by a notch located at the transverse axis of said one member, said flanges being of substantially the same length and equidistantly spaced lengthwise of the member from the notch, at least one of said members being formed with an outstanding tenon on a marginal portion thereof, said tenon having substantially the same length as the overall length of said flanges and notch, said tenon having a curved outer surface meeting said marginal portion at its transverse axis to provide a stop shoulder having substantially the same length as the length of the notch, said tenon being formed with an undercut groove at the base thereof on each side of the stop shoulder, at least one of said members being formed of material having determinable resiliency, the other dimensions of said members being such that, upon superimposition around a bail, the notch and stop shoulder may be aligned and the tenon forced past the flanges to cause the same to engage in the groove and the shoulder may enter the notch to restrain the members for endwise displacement, the remaining marginal portions of said members being respectively formed with a complementary inwardly extending flange and an upstanding tenon having a groove between its marginal portion and outer face of the tenon adapted to mutually interlock when the first named flanges and tenon are brought into said interlocking engagement.

3. A two part handle adapted to be snapped over a bail comprising a pair of semi-cylindrical members of the same length and diameter and each formed with an axial recess to provide clearance around the bail, each of said members having marginal portions, at least one of said marginal portions being formed with inwardly extending spaced flanges, at least another of said marginal portions being formed with an upstanding tenon having a sloping outer surface and an undercut groove at its base, the region between the flanges defining a notch, a stop shoulder formed on said tenon to partially fill the groove therein and being of substantially the same dimensions as the notch to fill the same when the members are assembled, the members being further so dimensioned that the flanges may be forced into the groove and the shoulder into the notch to interlock said members against axial and radial displacement with the marginal portions of one abutting the marginal portions of the other, said members, upon assembly, revealing in a right section through the groove, an interlocked flange and tenon on either side of a diameter normal to the plane marginal portions, the remaining marginal portions of said members being respectively formed with a complementary inwardly extending flange and an upstanding tenon having a groove between its marginal portion and outer face of the tenon adapted to mutually interlock when the first named flanges and tenon are brought into said interlocking engagement.

4. A handle as set forth in claim 3 wherein one of said members is formed with a pair of tenons extending outwardly from its marginal portions, and the other of said members is formed with flanges projecting inwardly from its marginal portions.

5. A handle as set forth in claim 3, wherein each of said members is formed with a tenon extending outwardly from one of its marginal portions, and with flanges projecting inwardly from the other of its marginal portions.

6. A handle as set forth in claim 3, wherein each of said members is formed with a tenon extending outwardly from one of its marginal portions, and with flanges projecting inwardly from the other of its marginal portions, the stop shoulder at the base of the tenon and the notch between the flanges being disposed at the transverse center of the members and the flanges and grooves extending substantially equidistantly along the marginal portions on either side thereof.

CLARE H. KAFER.

References Cited in the file of this patent

UNITED STATES PATENTS

| Number | Name | Date |
| --- | --- | --- |
| Re. 22,749 | Mason | Apr. 30, 1946 |
| 775,662 | Lyon | Nov. 22, 1904 |
| 1,216,653 | Brune | Feb. 20, 1917 |
| 2,398,436 | Mason | Apr. 16, 1946 |